(12) United States Patent
Kieselbach et al.

(10) Patent No.: US 9,165,049 B2
(45) Date of Patent: Oct. 20, 2015

(54) TRANSLATING BUSINESS SCENARIO DEFINITIONS INTO CORRESPONDING DATABASE ARTIFACTS

(71) Applicants: Oliver Kieselbach, Bielefeld (DE); Bogdan Vatkov, Pleven (BG); Harshavardhan Jegadeesan, Bangalore (IN)

(72) Inventors: Oliver Kieselbach, Bielefeld (DE); Bogdan Vatkov, Pleven (BG); Harshavardhan Jegadeesan, Bangalore (IN)

(73) Assignee: SAP SE, Walldorf (DE)

( * ) Notice: Subject to any disclaimer, the term of this patent is extended or adjusted under 35 U.S.C. 154(b) by 120 days.

(21) Appl. No.: 13/782,508

(22) Filed: Mar. 1, 2013

(65) Prior Publication Data
US 2014/0250121 A1  Sep. 4, 2014

(51) Int. Cl.
*G06F 17/30* (2006.01)
*G06Q 30/00* (2012.01)

(52) U.S. Cl.
CPC .......... *G06F 17/30595* (2013.01); *G06Q 30/00* (2013.01)

(58) Field of Classification Search
USPC ............................ 707/602, 54, 756, 790–792
See application file for complete search history.

(56) References Cited

U.S. PATENT DOCUMENTS

| | | | |
|---|---|---|---|
| 7,222,302 B2* | 5/2007 | Hauser et al. | 715/734 |
| 7,788,319 B2* | 8/2010 | Schmidt et al. | 709/203 |
| 8,375,330 B2 | 2/2013 | Kieselbach | |
| 2002/0147606 A1* | 10/2002 | Hoffmann et al. | 705/1 |
| 2004/0249645 A1* | 12/2004 | Hauser et al. | 705/1 |
| 2007/0150330 A1* | 6/2007 | McGoveran | 705/8 |
| 2007/0244738 A1* | 10/2007 | Chowdhary et al. | 705/10 |
| 2007/0255751 A1* | 11/2007 | Bansal et al. | 707/103 R |
| 2008/0167923 A1* | 7/2008 | Chowdhary et al. | 705/7 |
| 2012/0016999 A1 | 1/2012 | Kieselbach et al. | |
| 2012/0054286 A1 | 3/2012 | Kieselbach | |
| 2012/0054301 A1 | 3/2012 | Kieselbach | |
| 2012/0054335 A1 | 3/2012 | Kieselbach | |
| 2012/0054662 A1 | 3/2012 | Kieselbach | |
| 2012/0078802 A1 | 3/2012 | Kieselbach | |
| 2012/0089534 A1 | 4/2012 | Liebig et al. | |
| 2012/0089685 A1 | 4/2012 | Oliver Hoffmann et al. | |
| 2012/0102171 A1 | 4/2012 | Bhatt et al. | |
| 2012/0110468 A1 | 5/2012 | Ackermann et al. | |

(Continued)

OTHER PUBLICATIONS

U.S. Appl. No. 13/611,391, filed Sep. 12, 2012 entitled "Managing a Server Node Infrastructure".

(Continued)

*Primary Examiner* — Hanh Thai
(74) *Attorney, Agent, or Firm* — Fish & Richardson P.C.

(57) ABSTRACT

The present disclosure involves systems, software, and computer-implemented methods for providing process intelligence by translating a business scenario definition into one or more corresponding data storage system artifacts. One example method includes identifying a process intelligence scenario associated with one or more business processes and including one or more definitions defining an observable behavior of the one or more business processes, processing the one or more definitions to produce an executable description including one or more artifacts associated with a data storage system, the one or more artifacts associated with the one or more definitions, storing the executable description in the data storage system, and processing one or more flow events associated with the one or more business processes using the executable description in the data storage system to expose the observable behavior of the business process defined in the process intelligence scenario.

22 Claims, 5 Drawing Sheets

(56) References Cited

U.S. PATENT DOCUMENTS

| | | | |
|---|---|---|---|
| 2012/0130906 A1* | 5/2012 | Klinker et al. | 705/301 |
| 2013/0055213 A1* | 2/2013 | Weigert | 717/126 |
| 2013/0104100 A1* | 4/2013 | Mueller | 717/106 |
| 2013/0138473 A1* | 5/2013 | Balko et al. | 705/7.27 |
| 2013/0139164 A1* | 5/2013 | Balko | 718/102 |
| 2013/0166495 A1* | 6/2013 | Kazmaier et al. | 707/602 |
| 2013/0282746 A1* | 10/2013 | Balko et al. | 707/758 |

OTHER PUBLICATIONS

U.S. Appl. No. 13/674,770, filed Nov. 12, 2012 entitled "Providing Multiple Level Process Intelligence and the Ability to Transition Between Levels".

U.S. Appl. No. 13/733,563, filed Jan. 3, 2013 entitled "Combining OData and BPMN for a Business Process Visibility Resource Model".

* cited by examiner

TRANSLATING BUSINESS SCENARIO DEFINITIONS INTO CORRESPONDING DATABASE ARTIFACTS

CROSS-REFERENCE TO CO-PENDING APPLICATION

This application is related to co-pending U.S. patent application Ser. No. 13/782,493 filed on Mar. 1, 2013, the entire contents of which are hereby incorporated by reference.

TECHNICAL FIELD

The present disclosure involves systems, software, and computer-implemented methods for providing process intelligence by translating a business scenario definition into one or more corresponding data storage system artifacts.

BACKGROUND

Process intelligence solutions generally provide analysts with a particular view into data generated by running business process scenarios. Business process analysts may use this information to optimize a particular business process scenario. Business process analysts may also define process intelligence scenarios using a model definition language, such as Business Process and Model Notation (BPMN).

SUMMARY

The present disclosure involves systems, software, and computer-implemented methods for providing process intelligence by translating a business scenario definition into one or more corresponding data storage system artifacts. One example method includes identifying a process intelligence scenario associated with one or more business processes and including one or more definitions defining an observable behavior of the one or more business processes, processing the one or more definitions to produce an executable description including one or more artifacts associated with a data storage system, the one or more artifacts associated with the one or more definitions, storing the executable description in the data storage system, and processing one or more flow events associated with the one or more business processes using the executable description in the data storage system to expose the observable behavior of the business process defined in the process intelligence scenario.

While generally described as computer-implemented software embodied on tangible media that processes and transforms the respective data, some or all of the aspects may be computer-implemented methods or included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Figure 1:
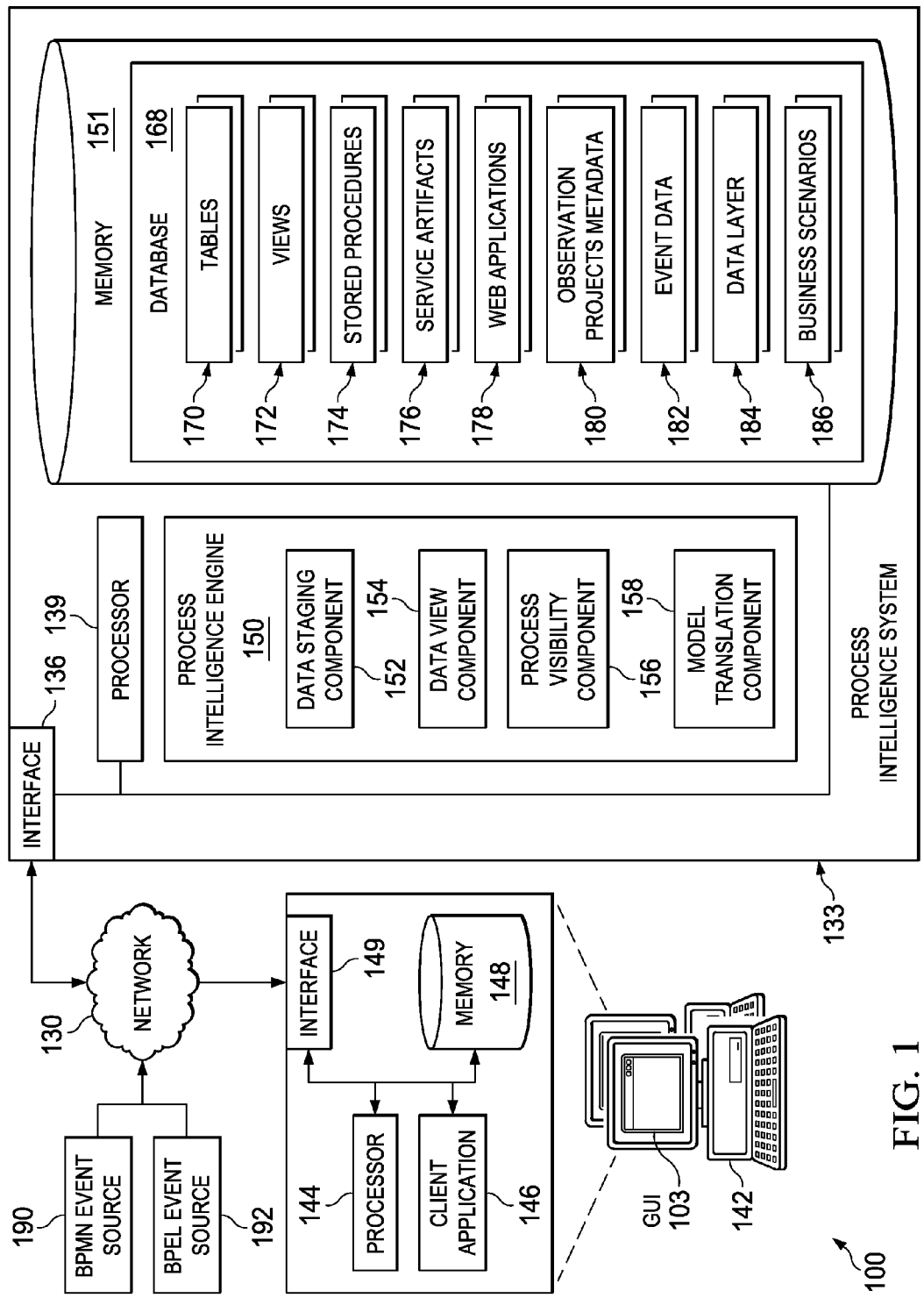
FIG. 1 is a block diagram illustrating an example system for storing a data set based on events generated by running business processes and correlating the events to business scenarios.

The present disclosure involves systems, software, and computer-implemented methods for providing process intelligence by correlating events from multiple business process systems to a single business scenario using correlation strategies.

Process intelligence solutions allow users to observe the behavior of a business process scenario. The business process scenario may include running business processes from multiple different business process systems. For example, a business process scenario may include actions performed by multiple different systems including, but not limited to, Enterprise Resource Planning (ERP) systems, Customer Relationship Management (CRM) systems, Supply Chain Management (SCM) systems, Product Lifecycle Management (PLM) systems, Manufacturing Execution systems, message-oriented middleware systems, BPM/Workflow systems, Web and legacy applications, and other suitable systems. One such process intelligence solution is described in co-pending U.S. application Ser. No. 13/674,770, which is hereby incorporated by reference.

The process intelligence solution may provide users and other systems with views into the behavior of the business process scenario by analyzing flow events received from the multiple business process systems. Flow events indicate a specific transition from one state to another state, and therefore describe a change in the lifecycle of a flow or flow step of a business process. For example, a flow event may be generated by a business process when the process starts, when the process terminates, when data is received, when a task completes, when an error occurs, or at any other suitable time.

Process intelligence scenarios may be defined by analysts using one or the standard model description languages used for describing the observable behavior of business processes or workflows. For example, an analyst may define a process intelligence scenario using the BPMN standard. Such a process intelligence scenario description may include the processes or workflow to observe, parts of the processes to observe, a particular flow event to observe, rules determining which events from which process are relevant and how to correlate this to an existing running process intelligence scenario, measures and indicator to analyze process performance, any process intelligence views for data aggregation, or any other suitable information regarding the process intelligence scenario.

For runtime execution, such a model definition may be translated into executable and structural components for use in a data storage system to process flow events received from the various business processes associated with the process intelligence scenario. To assist in the translation, a process intelligence-specific extension to a modeling language such as BPMN may be introduced to more accurately describe the process intelligence scenario for translation. The modeling language definition may be translated into artifacts native to or compatible with the specific data storage system, which are then used to process the flow events stored in the data storage system.

This approach has the advantage of optimizing processing of the process intelligence scenario by selecting appropriate native or otherwise compatible data storage system artifacts to provide the best performance. Further, as modeling languages such as BPMN are generally well understood, an analyst can create and define a process intelligence scenario using a familiar notation and be shielded from the actual implementation of the analysis in the data storage system.

FIG. 1 is a block diagram illustrating an example system 100 for providing process intelligence by allowing analysis of running business processes at multiple levels of detail. Specifically, the illustrated environment 100 includes or is communicably coupled with one or more clients 103, one or more event sources 190 and 192, and a network 130.

The example system 100 may include a process intelligence server 133. At a high level, the process intelligence server 133 comprises an electronic computing device operable to receive, transmit, process, store, or manage data and information associated with the environment 100. Specifically, the process intelligence server 133 illustrated in FIG. 1 is responsible for receiving, retrieving, or otherwise identifying events from various event sources, such as event sources 190 and 192, and processing those events to produce one or more views, allowing an analyst to investigate various properties and performance of one or more running business applications. In some cases, the process intelligence server 133 may receive requests from one or more clients 103. These requests may include requests for data from various layers, requests for transient data layers or views, and configuration requests related to the processing and generation of the various data layers.

As used in the present disclosure, the term "computer" is intended to encompass any suitable processing device. For example, although FIG. 1 illustrates a process intelligence server 133, environment 100 can be implemented using two or more servers, as well as computers other than servers, including a server pool. Indeed, process intelligence server 133 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated process intelligence server 133 may be adapted to execute any operating system, including Linux, UNIX, Windows, Mac OS®, Java™, Android™, iOS or any other suitable operating system. According to one implementation, process intelligence server 133 may also include or be communicably coupled with an e-mail server, a Web server, a caching server, a streaming data server, and/or other suitable server.

The process intelligence server 133 also includes an interface 136, a processor 139, and a memory 151. The interface 136 is used by the process intelligence server 133 for communicating with other systems in a distributed environment—including within the environment 100—connected to the network 130; for example, the client 103, as well as other systems communicably coupled to the network 130 (not illustrated). Generally, the interface 136 comprises logic encoded in software and/or hardware in a suitable combination and operable to communicate with the network 130. More specifically, the interface 136 may comprise software supporting one or more communication protocols associated with communications such that the network 130 or interface's hardware is operable to communicate physical signals within and outside of the illustrated environment 100.

As illustrated in FIG. 1, the process intelligence server 133 includes a processor 139. Although illustrated as a single processor 139 in FIG. 1, two or more processors may be used according to particular needs, desires, or particular implementations of the environment 100. Each processor 139 may be a central processing unit (CPU), a blade, an application specific integrated circuit (ASIC), a field-programmable gate array (FPGA), or another suitable component. Generally, the processor 139 executes instructions and manipulates data to perform the operations of the process intelligence server 133. Specifically, the processor 139 may execute the functionality required to receive and respond to requests from the client 103, as well as to receive flow events from the event sources 190 and 192 and process these flow events to produce the various data layers required for the various views configured in the process intelligence server 133.

The illustrated process intelligence server 133 also includes a process intelligence engine 150. In some cases, the process intelligence engine 150 may produce and organize data for use in the process intelligence server 133. This may include receiving business process events from the event sources 190 and 192, storing those events in a data store (such as database 168), and processing the events to produce various layers corresponding to views of the running business processes. In some instances, the process intelligence engine 150 is implemented as a software application executing on the process intelligence server 133. In other instances, the process intelligence engine 150 is implemented as a collection of software applications executing on one or more process intelligence servers as part of a distributed system. In still other instances, the process intelligence engine 150 is implemented as a separate hardware and/or software component separate from the process intelligence server 133. The process intelligence engine 150 may include one or more different components, such as those described below. These components may be separate software libraries, separate software applications, separate threads, or separate dedicated hardware appliances. In some implementations, certain components may be omitted or combined or additional components may be added.

In the depicted implementation, the process intelligence engine 150 includes a data staging component 152, a data view component 154, and a process visibility component 156. In some instances, the data staging component 152 may be operable to receive business process events from the event sources 190 and 192 and perform processing on the events to interpolate, extract, and/or derive additional information from them based on the events themselves and/or configuration information relating to the event sources and the running business processes.

In some implementations, the data staging component 152 may be operable to transform events from a particular event source into a common format used by the process intelligence server 133. For example, events received from an event source in BPMN format may be transformed into a normalized format before storage in database 168. Further, events received from an event source in a Business Process Execution Language (BPEL) format may be transformed into the same normalized format so that the other components of process intelligence server 133 can operate on them. This harmonization or normalization of events in different formats from various event sources may allow a unified view of a business process running across different business process systems.

In some cases, data staging component 152 may also perform more complex operations on the received event data. In some cases, the data staging component 152 may derive additional events beyond what is received from the event sources 190 and 192. For example, the data staging component 152 may derive from the receipt of a "stop" event for a certain process instance that a subsequent process instance responsible for the next task in a business scenario has started, and may thereby create a "start" event for that process instance. In another case, the data staging component 152 may filter out events from particular process instances that are not important. The data staging component 152 may determine which events are important by examining configuration data provided by an analyst or by an external system, such as, for example, the observation projects metadata 180. For example, an analyst may decide that informational status events produced by certain process instances do not contain any useful information about the given business scenario, and therefore may choose to configure the data staging component 152 to filter these events. In other cases, events may be filtered by many different criteria including, but not limited to, the source of the event, the type of the event, the process instance associated with the event, the task to which the event is associated, one or more actors associated with the event, or any other appropriate criteria.

In some implementations, the data staging component 152 may store the results of its operations in the database 168 or in some other data store. In other implementations, the data staging component 152 may perform its processing on-demand when a request for specific data is received. In other cases, the data staging component 152 stores the event data received from the event sources 190 and 192 in the database 168. In still other instances, another component is responsible for storing the received event data in the database 168 and the data staging component 152 accesses the event data for processing through the database 168.

Process intelligence engine 150 may also include a data view component 154. In some cases, the data view component 154 may produce various views into the stored data according to configuration information, such as the observation projects metadata 180, the views 172, or any other appropriate configuration data. The views 172 produced by the data view component 154 may be either transient (i.e., produced in response to a request) or persistent (i.e., pre-computed and stored). The data view component 154 may produce its view by operating on data output and/or stored by the data staging component 152, by operating directly on events received from the various event sources 190 and 192, or by a combination of methods.

The process intelligence engine 150 may further include a process visibility component 156 that provides an interface for configuration and control of the features of the process intelligence server 133. Specifically, the process visibility component 156 allows an analyst, an administrator, an external system, or other suitable user to configure the various views, data processing, data correlation, event derivation, and other features of the process intelligence server 133. In some implementations, this configuration is performed by creating, editing, updating, and/or deleting the observation projects metadata 180. The process visibility component 156 may include a web interface allowing a user to specify the observation projects metadata 180. The process visibility component 156 may also include an application programming interface (API) allowing external programs and systems to do the same. The process visibility component 156 may also be distributed on both the process intelligence server 133 and the one or more clients 103 as part of a client/server application.

The process visibility component 156 may further allow a user or external system to specify various business scenarios for analysis by the system. To this end, the process visibility component 156 may present a list of business process instances and allow selection and grouping of the instances into business scenarios representative of larger processes that span multiple instances and/or business process systems. By allowing the identification of these business scenarios, the process visibility component 156 allows the system to be configured to present complex views of the data that are not practical by manually examining data from one system in isolation.

The process intelligence engine 150 may further include a model translation component 158. In some implementations, the model translation component 158 is configured to translate a process intelligence business scenario model definition into one or more database artifacts. For example, the model translation component 158 may receive a process intelligence business scenario model definition the GUI 142 or from any other suitable source. In some instances, the process intelligence business scenario model definition may include a definition of the process scenario in one or more modeling languages, including, but not limited to, BPMN, BPEL, Extensible Markup Language (XML), JavaScript Object Notation (JSON), or any other suitable modeling language. The process translation component 158 may process the model definition and produce one or more artifacts for storage and/or execution by the database 168 or by another system. In some cases the model translation component 158 may be a software component executing inside the process intelligence engine 150. The model translation component 158 may also be an external system configured to process the process intelligence model.

In some instances, the model translation component 158 may be configured to produce various tables, views, stored procedures, service artifacts, and other structures and executable components based on the received model definition. These executable components may be used to store and process events, such as those received from the event sources 190 and 192, in order to provide various views of a business scenario associated with the received model definition. In some cases, the model translation component 158 may produce a data storage system definition describing the various components and artifacts to be created in the database 168. For example, model definition component 158 may produce a Structured Query Language (SQL) definition indicating the various tables, views, stored procedures, and other artifacts that are to be created in order to process the scenario described by the model definition. In other implementations, the data storage system definition may be specified in any suitable definition language, including, but not limited to, XML, JSON, or BPEL.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The process intelligence server 133 also includes a memory 151, or multiple memories 151. The memory 151 may include any type of memory or database module and may take the form of volatile and/or non-volatile memory including, without limitation, magnetic media, optical media, random access memory (RAM), read-only memory (ROM), removable media, or any other suitable local or remote memory component. The memory 151 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the process intelligence server 133. Additionally, the memory 151 may include any other appropriate data, such as VPN applications, firmware logs and policies, firewall policies, a security or access log, print or other reporting files, as well as others.

As illustrated in FIG. 1, memory 151 includes or references data and information associated with and/or related to providing multiple process intelligence views related to running business applications. As illustrated, memory 151 includes a database 168. The database 168 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 168 may be operable to process queries specified in any structured or other query language such as, for example, Structured Query Language (SQL). In some instances, the database 168 may be a high-performance database management system (DBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database.

Database 168 may include different data items related to providing different views of process intelligence data. The illustrated database 168 includes one or more tables 170, one or more views 172, one or more stored procedures 174, one or more service artifacts 176, one or more web applications 178, observation projects metadata 180, a set of event data 182, one or more data layers 184, one or more business scenarios 186, and a set of correlation strategy data 188. In other implementations, the database 168 may contain any additional information necessary to support the particular implementation.

The tables 170 included in the illustrated database 168 may be database tables included as part of the schema of database 168. The tables 170 may also be temporary or transient tables created programmatically by requests from the clients 103 or from any other source. In some implementations, the structure of tables 170 may be specified by SQL statements indicating the format of the tables and the data types and constraints of the various columns. Further, the tables 170 may include any indexes necessary to allow for rapid access to individual rows of the tables. These indexes may be stored along with the tables 170, or may be stored separately in the database 168 or another system.

The views 172 included in the illustrated database 168 may be pre-computed or transient views into the data stored in the database 168. Generally, a view is query that is specified and stored in the database for quick retrieval. In some instances, the views will be specified in the same manner as standard database tables, with additional options for specifying whether the view is persistent (i.e., pre-computed and stored in the database) or transient (i.e., computed when a request for the view is received). In other implementations, the views 172 may be stored separately from the database as scripts or other programs operable to query the database 168 and present the data required by the view.

As illustrated, database 168 also includes stored procedures 174. Generally, a stored procedure is a sub-routine that is accessible to clients and programs that access a relational database. For example, a database might include a stored procedure called "max( )" that determines the maximum value in a returned series of integers, or a procedure called "sum( )" that produces a total when given a series of integers. Stored procedures might also be used to process data already stored in the database, or to process data as it is being inserted into the database. In some cases, the stored procedures 174 may be used to process the event data received from event sources 190 and 192 in order to produce one or more data layers representing the various views provided by the process intelligence server 133. In other cases, the stored procedures 174 may be used to generate any transient views provided in response to requests from clients by the process intelligence server 133.

Database 168 may also include service artifacts 176. In some implementations, the service artifacts 176 may include intermediate data formats used in processing the event data to produce the various layers. The data staging component 152 and the data view component 154 may produce various service artifacts as part of their processing. In some implementations, these service artifacts may include temporary or permanent database tables, views, files, or other data.

In illustrated FIG. 1, database 168 may include web applications 178. In some implementations, web applications 178 may include web applications for exposing data stored in the database 168 to external users and/or systems. The web applications 178 may be implemented in any appropriate technology such as, for example, HTML5, Javascript®, PHP, or any other technology or combination of technologies. In some instances, the web applications 178 are applications relating to access in-memory, as well as other types, of databases.

Illustrated database 168 may also include observation projects metadata 180. As discussed previously, observation projects metadata 180 may be used by the process intelligence engine 150 in staging and processing the event data received from the event sources 190 and 192, as well as providing views of the data at various levels. In some implementations, the observation projects metadata 180 is produced by the process visibility component 156 as a result of a user or external system specifying attributes of a business scenario to be observed.

Database 168 may also include event data 182. As discussed previously, event data 182 may be received, retrieved, identified, replicated, or otherwise obtained from the one or more event sources 190 and 192. In some instances, the event data 182 is stored in an unmodified format as it is received from event sources 190 and 192. This unmodified format may be referred to as "raw event data." In some implementations, this raw event data is the basis for the staging, processing, correlation, and, ultimately, data view processing performed by the process intelligence engine 150. In other implementations, the system performs initial normalization or harmonization steps prior to inserting the event data 182 into the database 168, so the event data 182 is not truly "raw." Such processing may include translation, filtering, derivation or any other suitable processing.

In some instances, the event data 182 can be used as the base for deriving additional data layers 184. In such cases, the event data 182 is processed to produce one or more data layers containing data useful for analyzing the respective business scenarios identified to the system. In some cases, the data layers 184 may include references to the original event data 182 from which they were derived. For example, the event data 182 may include an event representing the start of a particular process instance. In such a case, the event may include a unique identifier, such as an event ID. A data layer 184 that is produced by processing the event data 182 may include an event corresponding to the original event from the event data 182. The new event may include additional derived or external information about the event, such as, for example, an identifier representing the business scenario associated with the event. In such cases, the new event in the data layer 184 may include the event ID of the original event. In this way, the data layer 184 may allow a user or external system to "drill down" to a lower layer in order to obtain a different view of a business process. Further, different layers in the one or more data layers may also build off one another in this same manner, such that a layer may contain a reference to the associated data at the layer from which it was derived. In some cases, including these references between the layers makes it possible for the system to transition between the different layers, allowing a user or analyst to view data representing the operation of the business scenario in many different ways from a single system.

Illustrated database 168 may also include business scenarios 186. In some cases, business scenarios 186 may define groups of business process instances that interact as part of a given business process. The business process instances may be executed on different business process systems, on the same business process system, or on a combination of the two. In some instances, the business scenarios 186 may also define particular events from different business process instances that are important or relevant for analysis. In other instances, the business scenarios 186 may be defined by a user who manually identifies the different business process instances and/or events involved in a particular business scenario. In other cases, the business scenarios 186 may be defined automatically by a computer system by examining event data from the event sources 190 and 192, by executing according to rules defined by a user, or by any other appropriate mechanism or combination or mechanisms.

The illustrated environment of FIG. 1 also includes a client 103, or multiple clients 103. Client 103 may be any computing device operable to connect to or communicate with at least the process intelligence server 133 via the network 130 using a wireline or wireless connection. In general, client 103 comprises an electronic computer device operable to receive, transmit, process, and store any appropriate data associated with environment 100 of FIG. 1.

There may be any number of clients 103 associated with, or external to, environment 100. For example, while the illustrated environment 100 includes one client 103, alternative implementations of environment 100 may include multiple clients 103 communicably coupled to the process intelligence server 133 and/or the network 130, or any other number suitable to the purposes of environment 100. Additionally, there may also be one or more additional clients 103 external to the illustrated portion of environment 100 that are capable of interacting with the environment 100 via the network 130. Further, the term "client" and "user" may be used interchangeably as appropriate without departing from the scope of this disclosure. Moreover, while client 103 is described in terms of being used by a single user, this disclosure contemplates that many users may use one computer, or that one user may use multiple computers.

Illustrated client 103 is intended to encompass any computing device such as a desktop computer, laptop/notebook computer, wireless data port, smart phone, personal data assistant (PDA), tablet computing device, one or more processors within these devices, or any other suitable processing device. For example, client 103 may comprise a computer that includes an input device, such as a keypad, touch screen, or other device that can accept user information, and an output device that conveys information associated with the operation of the process intelligence server 133 or client 103 itself, including digital data, visual information, or a graphical user interface (GUI) such as GUI 142. Client 103 may include an interface 149, a processor 144, a memory 148 and a client application 146. Client 103 may be used by a user to access the process intelligence server 133, to view or change items in the database 168 (such as business scenarios 186), or to view process intelligence reports such as, for example, web applications 178.

Example environment 100 may also include or be communicably coupled to one or more event sources 190 and 192. In some implementations, these event sources are business process platforms producing events representing various aspects of running business processes, such as, for example, state transitions, error conditions, informational messages, failure conditions, processes starting, process terminating, and other events and indications related to the running processes. The event sources 190 and 192 may provide a stream of these events to the process intelligence server 133 in the form of messages sent across network 130. In some implementations, these event messages are sent in real-time or pseudo real-time, while in other implementations the messages are cached by the event sources 190 and 192 and sent in large groups. In still other implementations, the process intelligence server 133 polls the event sources 190 and 192 requesting any new events and the event sources 190 and 192 respond with any events produced since the last poll. In another implementation, the event sources 190 and 192 communicate events by calling methods exposed through an API associated with process intelligence server 133. In still other cases, the process intelligence server 133 is integrated into the event sources 190 and 192.

In some instances, the event sources 190 and 192 may insert events directly into database 168 or may communicate events from associated databases into database 168 through the use of replication protocols.

The event sources 190 and 192 may produce business process events in different formats such as, for example, BPEL, BPMN, advanced business application programming (ABAP), or any other appropriate format or combination of formats. In some implementations, the event sources 190 and 192 will communicate the events to process intelligence server 133 in a normalized event format different from their native event formats by performing a translation prior to sending the event.

Figure 2:
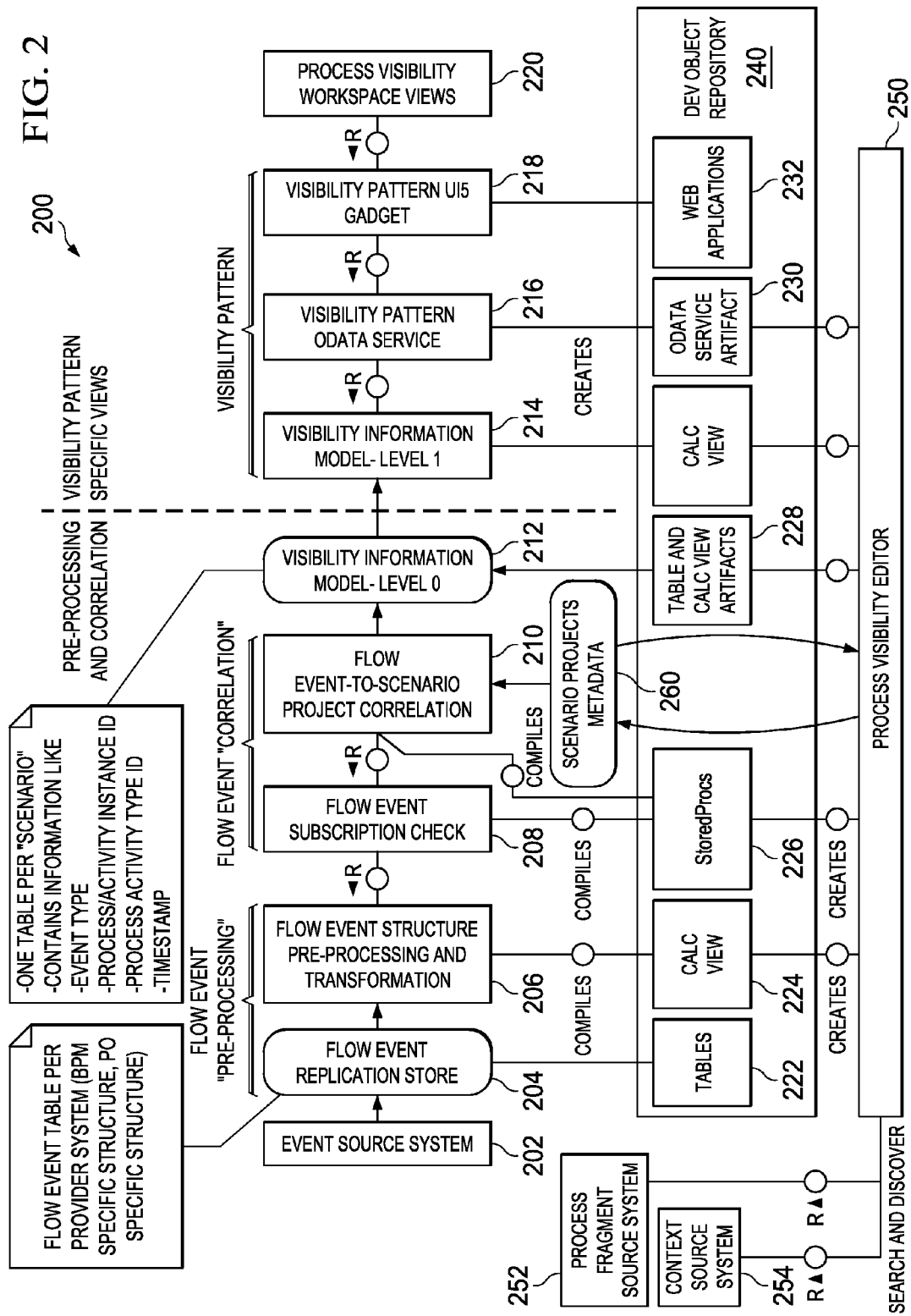
FIG. 2 is a block diagram illustrating an example system for processing events received from event sources to correlate the events to business scenarios.

FIG. 2 is a block diagram illustrating an example system 200 for processing events received from event sources 190 and 192 to produce the multi-layered data set. Generally, the illustrated system 200 is divided into two sections: pre-processing/correlation, and visibility. In some implementations, the example system 200 may include or be communicably coupled to a development object repository 240, and a process visibility editor 250.

The example system 200 may include or be communicably coupled to an event source system 202. In some implementations, the event source system 202 may be identical or similar to the event sources 190 and 192 discussed relative to FIG. 1, while in other implementations the event source system 202 may be different. As illustrated, the event source system 202 may be communicably coupled to a flow event replication store 204. The flow event replication store 204 may store events from the event source system 202 in a raw format, similar to event data 182 in FIG. 1. In other implementations, the flow event replication store 204 is a replicated table included in both the event source system 202 and the example system 200 that is kept synchronized by the database engines of the respective systems. The flow event replication store 204 may include one or more tables 222 which may be similar to or identical in structure to the tables 170 discussed relative to FIG. 1.

The illustrated system 200 also includes a flow event structure pre-processing and transformation component 206. In some cases, the flow event structure pre-processing and transformation component 206 may be communicably coupled to the flow event replication store 204. In some instances, the flow event structure pre-processing and transformation component 206 reads raw event data from the flow event replication store 204 and performs pre-processing and transformation procedures on the event data during the process of preparing one or more data layers from the raw event data. In some instances, the functionality of the flow event structure pre-processing and transformation component 206 includes or is similar to some aspect of the data staging component 152 discussed relative to FIG. 1, and may include normalizing or otherwise translating the raw event data stored in the flow event replication store 204 into a common format to be processed by other parts of the system. The flow event structure pre-processing and transformation component 206 may create one or more calc views 224. In some implementations, these views may be identical or similar to the views 172 discussed relative to FIG. 1.

The illustrated system 200 may also include a flow event subscription check component 208 operable to determine whether a particular event is relevant or important to any particular business scenario. If an event is deemed not important, it may not be included in the subsequently produced data layer related to a particular business scenario. This filtering of events may occur according to the scenario projects metadata 260 or according to any other specification of which events are important to a given business scenario.

The illustrated system 200 may also include a flow event-to-scenario project correlation component 210 communicably or otherwise coupled to the flow event subscription check component 208. The flow event-to-scenario project correlation component 210 may operate to correlate events from various business process instances into identified business scenarios.

The illustrated system 200 may also include a first visibility information model 212 which may also be referred to as "Level 0." In some cases, Level 0 212 is a data layer as illustrated in FIG. 1. Level 0 212 may represent a view of business scenarios as defined by an analyst using a tool to interface with the system 200, such as the process visibility editor 250 (discussed below). In some implementations, Level 0 212 is a persistent data layer upon which other transient upper data layers are derived. In other cases, Level 0 212 is itself a transient layer produced on-demand in response to a received request for data. In some implementations, Level 0 212 is stored in a database, such as database 168 of FIG. 1. In some implementations, Level 0 212 may produce various tables and calc view artifacts 228 that represent various aspects of the first visibility information model 212.

The illustrated system 200 may also include a second visibility information model 214, which may also be referred to as "Level 1." In some cases, the Level 1 214 is a data layer, as illustrated in FIG. 1. In some implementations, Level 1 214 may be a transient data layer produced in response to a request for a specific data view. In other implementations, Level 1 214 may be a persistent data layer. In some implementations, Level 0 and Level 1 include references between one another to allow a user or analyst to "drill down" or "drill up" from one layer to another, as described relative to FIG. 1. Using these references, it may be possible for a user or analyst to access any data layer from any other data layer.

The illustrated system 200 also includes multiple process visibility workspace views 220. In some implementations, these views are visual representations of the data produced in the second visibility information model 214. The data may be presented to users or external systems through a graphical user interface (GUI) such as a web page. In other cases, the visibility workspace views 220 may be presented to users in the form of generated reports delivered to the user such as, for example, by email. In such instances, the reports may be in a format readable by standard desktop applications. Such formats may include Excel, Postscript, PDF, Word Doc, Access database, plain text, or any other suitable format or combination of formats.

The illustrated system 200 may also include a visibility pattern Odata service 216 and a visibility pattern UI5 gadget 218. In some implementations, these components may produce and present the process visibility workspace views 220 to the user. In other implementations, these components perform additional processing on the second visibility information model 214 before presenting the information contained therein to the requesting user.

The illustrated system 200 may also include or be communicably coupled to a process visibility editor 250. In some implementations, the process visibility editor 250 is a graphical or other interface that allows a user to identify and design the different data layers in order to allow the user to better view running business scenarios. In some implementations, this is accomplished by allowing the user to identify the different business process instances that are included in each business scenario, and by allowing the user to specify what data from a business scenario is important for them to see. For example, a user may identify a first event in a first process instance to be relevant to a certain business scenario, and identify a second event in a second instance as relevant to the same business scenario. In some implementations, the process fragment source system 252 provides information to the process visibility editor 250 regarding which process instances are available and/or currently running in a given business system or set of business systems. In other implementations, the context source system 254 provides information to the process visibility editor 250 regarding which process instances are related to which business scenarios.

The illustrated system 200 may also include stored procedures 226. In some cases, stored procedures 226 are similar or identical to the stored procedures 174 described relative to FIG. 1, while in other cases the stored procedures 226 may be configured specifically for the illustrated system 200. Illustrated system 200 may also include Odata service artifacts 230. In some cases, the Odata service artifacts 230 are similar or identical to the service artifacts 176 described in FIG. 1, while in other cases the Odata service artifacts 230 may be configured specifically for illustrated system 200. Illustrated system 200 may also include web applications 232. In some cases, the Web Applications 232 are similar or identical to the web applications 178 described in FIG. 1, while in other cases the web applications 232 may be configured specifically for illustrated system 200.

Figure 3:
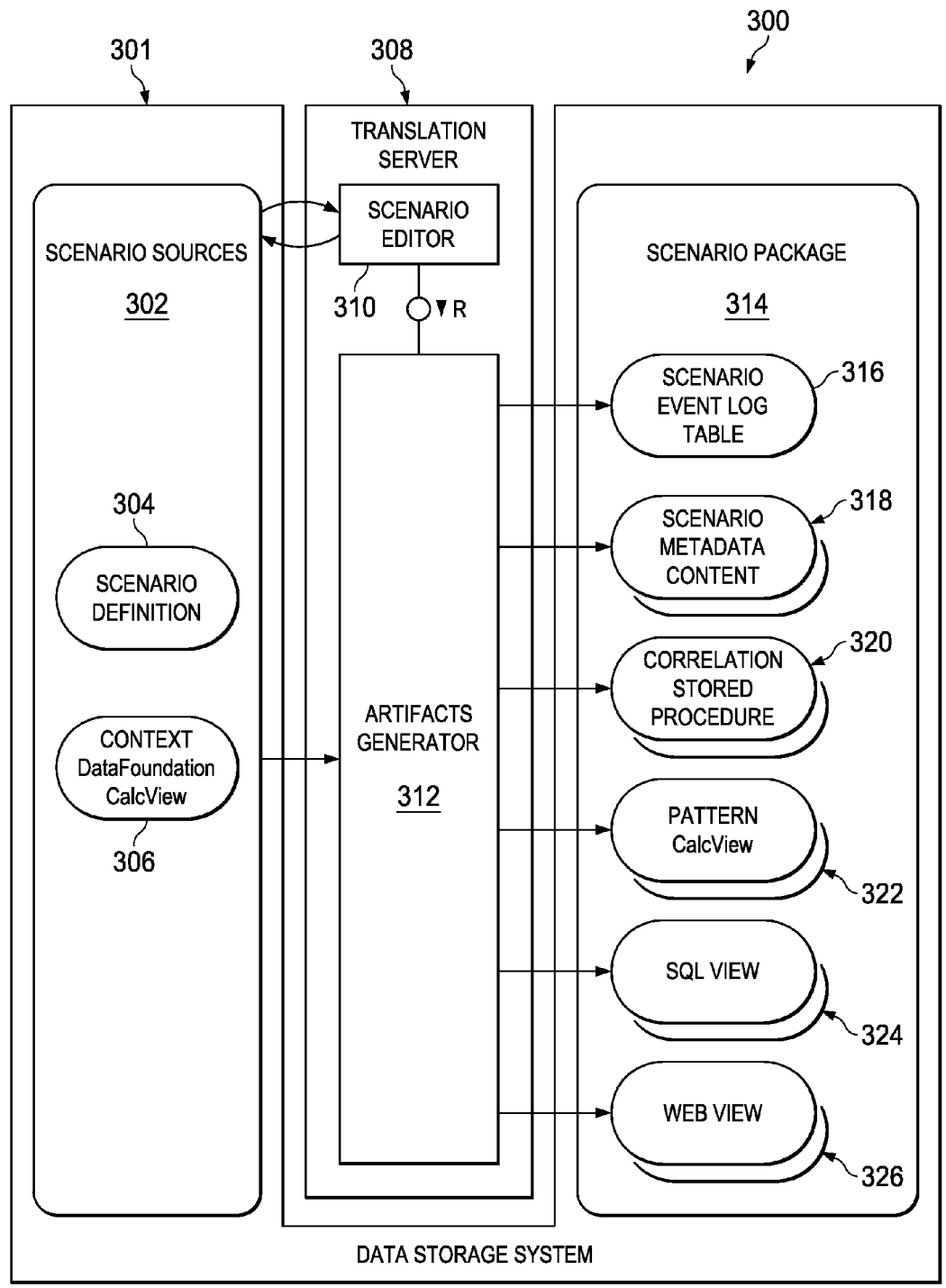
FIG. 3 is a block diagram illustrating an example system for translating a scenario definition into one or more data storage artifacts.

Referring now to FIG. 3, an example system 300 is shown for translating a scenario definition into one or more data storage system artifacts. Example system 300 includes scenario source 302. In some implementations, the scenario source 302 may be a GUI allowing a user to input a scenario definition. Scenario source 302 may also be a data storage system including predefined scenario definitions. In some cases, the scenario source 302 may allow a user to specify a scenario definition in a model definition language such as BPMN.

The scenario source 302 may include a scenario definition 304. In some implementations, the scenario definition 304 may be a description of a process intelligence scenario. Scenario definition 304 may define an interaction between multiple business processes the user desires to analyze. In some implementations, the scenario definition 304 may identify one or more business processes that the user desires to analyze. The scenario definition 304 may also identify one or more events occurring between the one or more business processes. In some cases, the scenario definition 304 may specify an expected order of events between the one or more business processes. Scenario definition 304 may also specify which events between the one or more business processes should be stored and which events should be filtered (or not stored). In some instances, the scenario definition 304 may be specified in a model definition language such as BPMN. Scenario definition 304 may also be specified in any suitable language, including, but not limited to, BPEL, SQL, JavaScript, Python, XML, or any other suitable language.

As shown, scenario source 302 also includes a context view 306. In some implementations, context view 306 includes context information about scenario definition 304 that is not a part of the definition itself. Such context information may include the type of business processes to be monitored, author data about the scenario definition 304, global parameters relating to the translation of the scenario definition, configuration information related to the scenario source 302, or any other suitable context information.

Example system 300 also includes a translation server 308. In some implementations, the translation server 308 is an external server operating on data stored in data storage system 301. The translation server 308 may also be an executable component stored in or implemented as part of data storage system 301. The translation server 308 may include a scenario editor 310. In some instances, scenario editor 310 allows a user to view or modify scenario definitions, such as scenario definition 304. In some implementations, the scenario definition 304 may be similar or identical to the business process scenario model definition discussed relative to FIG. 1. The scenario editor 310 may also be an automated process that retrieves scenario definitions from the data storage system 301. In some implementations, scenario editor 310 includes a graphical user interface that allows the user to create, view, or modify the scenario definitions.

The translation server 308 may also include an artifacts generator 312. In some instances, the artifact generator 312 takes as input the scenario definition 304 and the context view 306, and produces one or more data storage system artifacts corresponding to the scenario definition 304. In some implementations, the artifact generator 312 may be a software process running on the translation server 308. The artifact generator 312 may also be an executable data storage artifact stored in data storage system 301.

The artifact generator 312 may be configured to analyze the scenario definition 304 in order to produce the one or more data storage artifacts. In some instances, the artifact generator 312 is configured to parse the scenario definition 304 and produce one or more data storage artifacts corresponding to the various elements of the scenario definition 304. For example, if the artifact generator 312 identifies the definition of an event format within the scenario definition 304, the artifact generator 312 may generate a table schema corresponding to this event format. The table schema may then be used to create a table within data storage system 301 to store events related to the scenario definition 304. During scenario execution, this table may be populated by events from the monitored business processes, which can then be processed to perform the desired process intelligence analysis. In some implementations, the artifact generator 312 may parse the scenario definition 304 and create corresponding database artifacts for each definition or set of definitions. The artifact generator 312 may also analyze the scenario definition 304 to determine an observable behavior modeled by the scenario definition 304. This analysis may include referring to internal or external rule sets defining scenario translation behavior. In some instances, the artifact generator 312 may include a machine learning component or components configured to analyze all or part of the process definition 304 and determine a strategy for creating the data storage system artifacts.

As shown, the artifact generator 312 may produce a scenario package 314. In some instances, the scenario package 314 is a logical or physical grouping of the data storage system artifacts generated by artifact generator 312 corresponding to scenario definition 304. The scenario package 314 may be a table or collection of tables inside data storage system 301 grouping the generated artifacts and associating them with the scenario defined by scenario definition 304. The scenario package 314 may also be a separate database or collection of databases inside data storage system 301. In some instances, the scenario package 314 may be stored in the data storage system 301 alongside other scenario packages, differentiated from those other scenario packages by a unique identifier, by presence in dedicated tables, or by any other suitable differentiation mechanism.

The illustrated scenario package 314 may include a scenario event log table 316. In some cases, the scenario event log table 316 includes a schema suitable for storing events defined in scenario definition 304. The scenario event log table 316 may be a single table or a collection of one or more tables for storing events associated with the given scenario. In some instances, the scenario event log table 316 may be populated by an external process that receives or retrieves the events from the one or more business processes. The scenario event log table 316 may also be populated by a customized executable component, such as a script or stored procedure, generated by the artifact generator 312 for the associated scenario.

The scenario package 314 may also include scenario metadata 318. In some implementations, scenario metadata 318 includes data related to the scenario that is not included in the event data stored in the scenario event log table 316. The scenario metadata 318 may also include information regarding the scenario from the scenario definition 302. For example, the scenario metadata 318 may include information defining various aspects about the scenario, such as the types of the one or more business processes to be monitored, the expected order of the events, network addresses of the one or more business processes, directives included in the scenario definition 304 by the author, or any other suitable information.

The illustrated scenario package 314 also includes a correlation stored procedure 320. In some implementations, the correlation stored procedure 320 is an executable artifact operable to process events in the scenario event log table 316 and correlate the events to a business scenario instance. In some cases, the correlation stored procedure 320 performs operations similar or identical to those performed by components 208 and 210 of example system 200 from FIG. 2. The correlation stored procedure 320 may be an insert trigger configured to process events as they are added to scenario event log table 316. In some instances, the correlation stored procedure 320 may be operable to process the events according to one or more configurable correlation strategies. These correlation strategies maybe included in a separate table inside data storage system 301, or maybe included within correlation stored procedure 320. In some cases, these correlation strategies maybe stored and processed as described in co-pending application Ser. No. 13/782,493 filed Mar. 1, 2013, now U.S Pat. No. 9,037,525 issued May 19, 2015, entitled "Correlating Data From Multiple Business Processes to a Business Process Scenario", which is hereby incorporated by reference.

The scenario package 314 may also include a pattern calc view 322. In some implementations, the pattern calc view 322 may be an intermediate view used while processing events from the scenario event log table 316. The pattern calc view 322 may also correspond to the processed event data present at "Level 0" in FIG. 2. Scenario package 314 may also include one or more SQL views 324. In some implementations, these SQL views 324 may represent specific views of the data defined in scenario definition 304. The SQL views 324 may be read by external applications in order to obtain information about the business scenario. In some implementations, the one or more SQL views 324 may correspond to specific use cases defined by the scenario definition 304. These use cases may correspond to one or more external applications.

The scenario package 314 may also include one or more web views 326. In some implementations, the one or more web views 326 may include web-enabled templates for displaying reports based on processed event data from the scenario event log table 316. The one or more web views 326 may also include code or instructions operable to expose the one or more SQL views 324 to a user via a web browser. In some implementations, the one or more web views 326 may include webpages specified as suitable technology including, but not limited to, HTML, HTML5, JavaScript, FLASH, XML, or any other suitable technology. The one or more of these may also include application-specific formats such as EXCEL, WORD, PDF, or other suitable application-specific formats.

Figure 4:
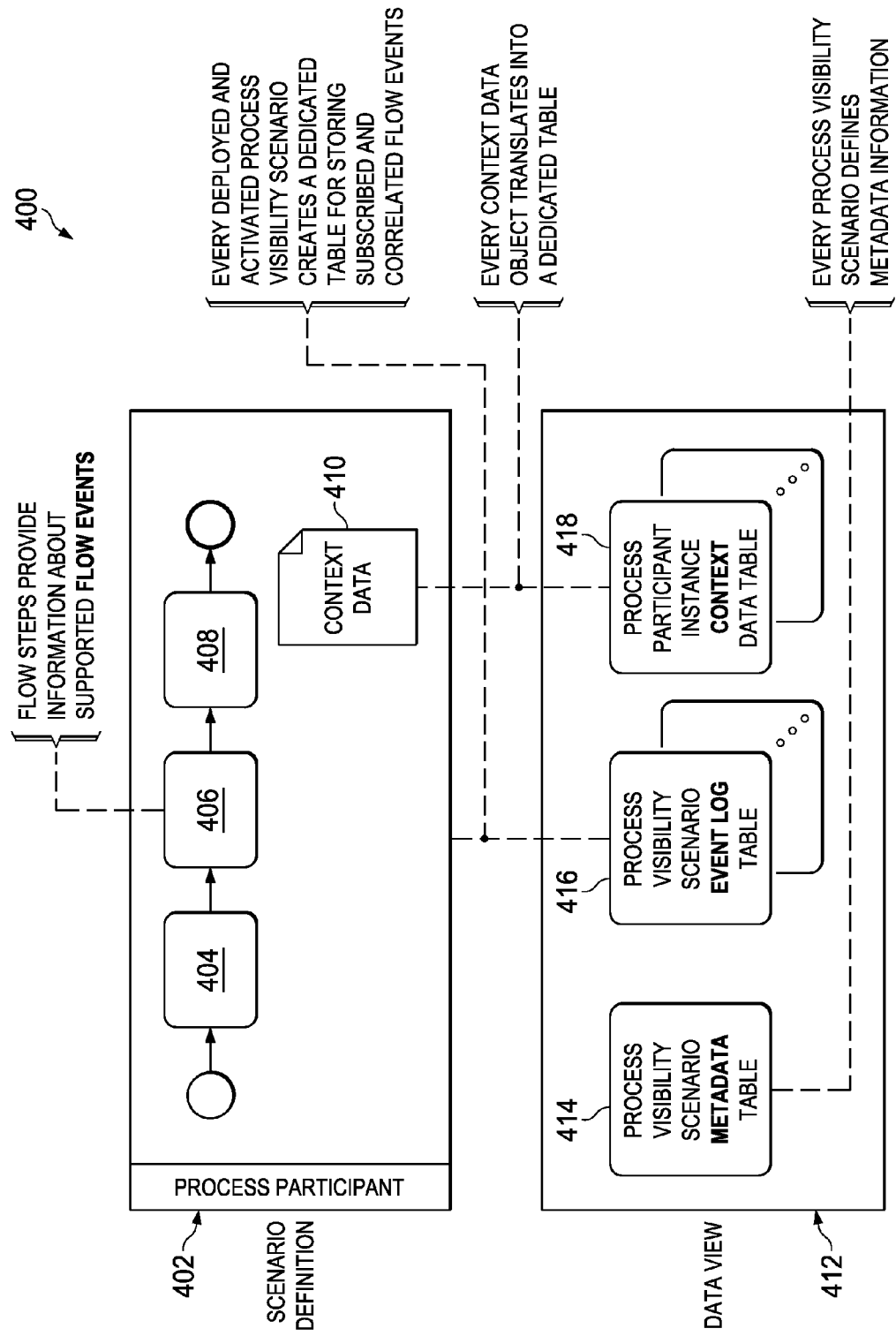
FIG. 4 is a block diagram illustrating an example translation from a scenario definition to one or more data storage artifacts.

FIG. 4 is a block diagram illustrating an example translation 400 from a scenario definition 402 to a data view 412 including one or more data storage artifacts. The scenario definition 402 includes one or more flow stages 404, 406, 408 that provide information about supported flow events associated with the scenario definition 402. In some cases, the flow stages 404, 406, 408 are discrete stages within a business process scenario. For example, flow stage 404 may be a stage in which the business process scenario collects input from a user. Flow stage 406 may be a stage that receives this collected input from the user and performs some processing on it. In some instances, the flow stages 404, 406, 408 may be performed by different business process systems. The flow stages 404, 406, 408 may also be performed by the same business processes system. In some cases, the flow stages 404, 406, 408 may represent different business process instances.

In some instances, the flow stages 404, 406, 408 may provide information about events expected to be received at that stage. For example, flow stage 404 may indicate that a "FLOW STARTED" event is expected at this stage of the business process scenario. The flow stage 404 may also indicate that the "FLOW STARTED" event includes an indication of the business process instance that has started. The flow stages 404, 406, 408 may also provide information related to correlating events between the different flow stages. For example, flow stages 404, 406, 408 may indicate a common identifier that can be used to correlate events between these different stages. Flow stages 404, 406, 408 may also indicate other types of correlation strategies to be used to correlate events, such as, for example, composite identifiers including more than one identifiers from each event, code fragments to be executed to perform the correlation, or any other suitable correlation strategy or combination of correlation strategies.

The scenario definition 402 may also include context data 410. In some instances, the context data 410 may include additional information about the business process scenario not included in the flow stages 404, 406, 408. This information may include, but is not limited to, information regarding the business process scenario as a whole unrelated to any particular flow stage, configuration data to use during scenario analysis, context data related to one or more of the flow stages 404, 406, 408, historical information related to the business process scenario, or any suitable information related to the business process scenario represented by scenario definition 402, or related to the one or more flow stages 404, 406, 408.

The example translation 400 includes a data view 412 that may be produced by processing the scenario definition 402. The data view 412 may be a logical or physical grouping of one or more data storage system artifacts corresponding to the scenario definition 402. In some instances, the data view 412 may be a table or collection of tables inside a database system. The data view 412 may also be a distributed collection of data stored on one or more servers.

The data view 412 may include one or more data storage system artifacts corresponding to the one or more flow stages 404, 406, 408, and the context data 410 of the scenario definition 402. The one or more data storage system artifacts may include a metadata table 414, a scenario event log table 416, and a participant instance context data table 418. In some instances, the metadata table 414, the scenario event log table 416, and the participant instance context data table 418 may be tables created inside a database system. The metadata table 414, the scenario that log table 416, and the participant instance context data table 418 may also be formatted or unformatted storage locations created for the various associated types of data described below. Such storage locations may include, but are not limited to, servers, cloud storage systems, memory locations, or any other suitable type storage location.

The data view 412 may include a metadata table 414. The metadata table 414 may include data related to the business process scenario defined by the scenario definition 402. In some instances, the metadata table 414 may include information about the various business process systems involved in the business process scenario defined by scenario definition 402. The metadata table 414 may also include information about the various business process instances involved in the business process scenario defined by scenario definition 402.

In some implementations, the metadata table 414 may include information necessary for processing events received from the business process instances involved in the business process scenario defined by scenario definition 402. The metadata table 414 may also include any other suitable information related to the business process scenario defined by scenario definition 402, related to the flow stages 404, 406, 408, related to the content or structure of events to be analyzed as part of the business process scenario, or any other suitable information.

The data view 412 may also include a scenario event log table 416. Scenario event log table 416 may include a structure suitable for holding events produced by the business process instances involved in the business process scenario defined by scenario definition 402. In some instances, a single scenario event log table 416 will be produced for each scenario definition 402. Multiple scenario event log tables 416 may also be produced for a single scenario definition 402. In some instances, the scenario event log table 416 may store raw events generated by the business process instances associated with the business process scenario. The scenario event log table 416 may also store events associated with business process scenarios that have already been processed into a common format. The structure of the scenario event log table 416 may be determined based on the contents of the flow stages 404, 406, 408. For example, if the flow stages 404, 406, 408 indicate that two different types of events will be analyzed as part of the business process scenario, the structure of the scenario event log table 416 may be adapted specifically to store the two different types of events.

The data view 412 may also include a participant instance context data table 418. In some implementations, the participant instance context data table 418 may include information about the various business process instances involved in the business process scenario defined by scenario definition 402. In some cases, the participant instance context data table 418 corresponds to the context data 410 from the scenario definition 402. A single participant instance context data table 418 may also correspond to multiple context data objects from the scenario definition 402. In some implementations, the participant instance context data table 418 may include information regarding the interaction between different business process instances related to scenario definition 402.

Figure 5:
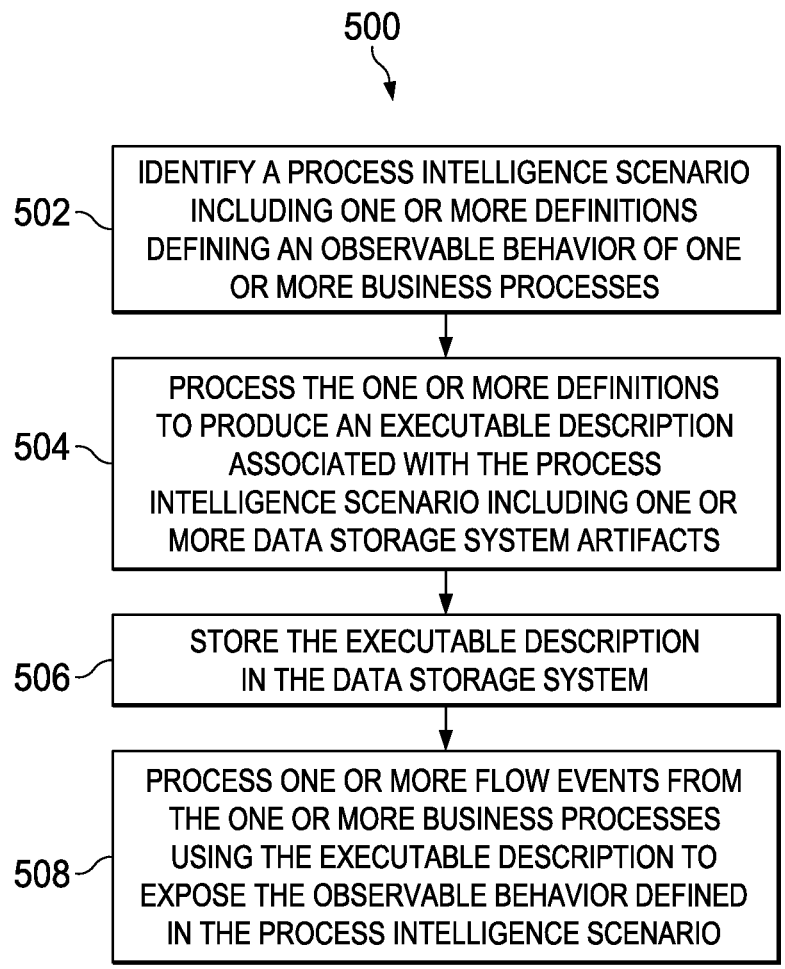
FIG. 5 is a flowchart of an example method for translating a scenario definition into one or more data storage artifacts.

FIG. 5 is a flowchart of an example method 500 for translating a scenario definition into one or more data storage artifacts. At 502, a process intelligence scenario including one or more definitions defining observable behavior of one or more business processes is identified. In some instances, the definitions may include different business process types, event types, flows, stages, and other information related to the process intelligence scenario. The process intelligence scenario may also define an observable behavior of one or more business processes. This observable behavior may be defined inherently by specifying the different process types of event types and other information related to the process intelligence scenario. The observable behavior may also be defined explicitly as an indication or directive describing the behavior to be observed by the process intelligence scenario. In some instances, the observable behavior may be specified as a desired view associated with the one or more business processes. In such a case, the system processing the process intelligence scenario may be responsible for choosing an appropriate strategy for delivering the desired view and thus exposing the observable behavior.

At 504, the one or more definitions are processed to produce an executable description associated with the process intelligence scenario including one or more data storage system artifacts. In some instances, processing the one or more definitions to produce the executable description includes translating a scenario definition defined in a modeling language, such as BPMN, into one or more artifacts associated with a data storage system such as a database. The one or more artifacts in the data storage system may then be used to process events received from the one or more business process systems, and to produce views associated with the observable behavior. In some instances, the data storage system artifacts may include any suitable structure or component of a data storage system including, but not limited to, tables, views, stored procedures, triggers, databases, scripts, web applications or any other suitable structure or component. In some instances, each definition of the one or more definitions is analyzed individually and a corresponding data storage system artifact is produced. The one or more definitions may also be analyzed as a whole or in discrete groups, and appropriate data storage system artifacts may be produced corresponding to one or more of the definitions. In some cases, certain data storage system artifacts may not correspond directly to any of the one or more definitions.

At 506, the executable description is stored in the data storage system. In some instances, storing the executable description in the data storage system includes generating and running instructions for creating the appropriate data storage system artifacts in the data storage system. For example, the method may generate SQL instructions corresponding to the one or more definitions, and execute those SQL instructions on the data storage system to create the data storage system artifacts.

At 508, one or more flow events from the one or more business processes are processed using executable description to expose the observable behavior defined in the process intelligence scenario. For example, one or more flow events received from the business process instances associated with the process intelligence scenario may be processed by a stored procedure generated from the one or more definitions to produce a view that exposes the observable behavior defined in the process intelligence scenario.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
 identifying a process intelligence scenario associated with one or more business processes, the process intelligence scenario including one or more definitions defining an observable behavior of the one or more business processes;

processing the one or more definitions to produce an executable description associated with the process intelligence scenario, the executable description including one or more artifacts associated with a data storage system, the one or more artifacts associated with the one or more definitions;

storing the executable description in the data storage system;

receiving one or more flow events from the one or more business processes associated with the process intelligence scenario, where the one or more flow events each indicate a specific state transition associated with a particular one of the one or more business processes; and processing the one or more flow events using the executable description in the data storage system to expose the observable behavior of the one or more business processes defined in the process intelligence scenario.

2. The computer-implemented method of claim 1, wherein the one or more definitions in the process intelligence scenario include Business Process Model and Notation (BPMN) definitions associated with the business process.

3. The computer-implemented method of claim 1, wherein the one or more artifacts include at least one of a database table, a metadata structure, a stored procedure, a trigger, a view, a Structured Query Language (SQL) statement, and a web application artifact.

4. The computer-implemented method of claim 1, wherein the one or more artifacts are native to the data storage system.

5. The computer-implemented method of claim 1, wherein the one or more definitions include at least one of a business process to observe, a workflow to observe, a step of the business process to observe, a flow event to observe, a rule for determining whether a flow event is relevant, a rule for correlating a flow event to a business scenario instance, a process intelligence view for data aggregation, a phase definition, and a milestone definition.

6. The computer-implemented method of claim 1, wherein processing the one or more flow events using the executable description in the data storage system includes correlating the one or more flow events with a business scenario instance.

7. The computer-implemented method of claim 6, wherein processing the one or more flow events using the executable description in the data storage system includes filtering flow events of the one or more flow events that are not relevant to the business scenario instance.

8. The method of claim 1, wherein the specific state transitions indicated by the one or more flow events include a change in the lifecycle of a flow of the corresponding business process.

9. The method of claim 1, wherein the one or more flow events are each generated by one of the one or more business processes in response to at least one of the following business process events: a start of a business process, a termination of a business process, when data is received by a business process, when a task of a business process completes, and when an error occurs in a business process.

10. A computer program product encoded on a tangible, non-transitory storage medium, the product comprising computer readable instructions for causing one or more processors to perform operations comprising:

identifying a process intelligence scenario associated with one or more business processes, the process intelligence scenario including one or more definitions defining an observable behavior of the one or more business processes;

processing the one or more definitions to produce an executable description associated with the process intelligence scenario, the executable description including one or more artifacts associated with a data storage system, the one or more artifacts associated with the one or more definitions;

storing the executable description in the data storage system;

receiving one or more flow events from the one or more business processes associated with the process intelligence scenario, where the one or more flow events each indicate a specific state transition associated with a particular one of the one or more business processes; and processing the one or more flow events using the executable description in the data storage system to expose the observable behavior of the one or more business processes defined in the process intelligence scenario.

11. The computer program product of claim 10, wherein the one or more definitions in the process intelligence scenario include Business Process Model and Notation (BPMN) definitions associated with the business process.

12. The computer program product of claim 10, wherein the one or more artifacts include at least one of a database table, a metadata structure, a stored procedure, a trigger, a view, a Structured Query Language (SQL) statement, and a web application artifact.

13. The computer program product of claim 10, wherein the one or more artifacts are native to the data storage system.

14. The computer program product of claim 10, wherein the one or more definitions include at least one of a business process to observe, a workflow to observe, a step of the business process to observe, a flow event to observe, a rule for determining whether a flow event is relevant, a rule for correlating a flow event to a business scenario instance, a process intelligence view for data aggregation, a phase definition, and a milestone definition.

15. The computer program product of claim 10, wherein processing the one or more flow events using the executable description in the data storage system includes correlating the one or more flow events with a business scenario instance.

16. The computer program product of claim 15, wherein processing the one or more flow events using the executable description in the data storage system includes filtering flow events of the one or more flow events that are not relevant to the business scenario instance.

17. A system, comprising:

memory for storing data; and one or more processors operable to:

identify a process intelligence scenario associated with one or more business processes, the process intelligence scenario including one or more definitions defining an observable behavior of the one or more business processes;

process the one or more definitions to produce an executable description associated with the process intelligence scenario, the executable description including one or more artifacts associated with a data storage system, the one or more artifacts associated with the one or more definitions;

storing the executable description in the data storage system;

receiving one or more flow events from the one or more business processes associated with the process intelligence scenario, where the one or more flow events each indicate a specific state transition associated with a particular one of the one or more business processes; and processing the one or more flow events using the executable description in the data storage system to expose the observable behavior of the one or more business processes defined in the process intelligence scenario.

18. The system of claim 17, wherein the one or more definitions in the process intelligence scenario include Business Process Model and Notation (BPMN) definitions associated with the business process.

19. The system of claim 17, wherein the one or more artifacts include at least one of a database table, a metadata structure, a stored procedure, a trigger, a view, a Structured Query Language (SQL) statement, and a web application artifact.

20. The system of claim 17, wherein the one or more artifacts are native to the data storage system.

21. The system of claim 17, wherein the one or more definitions include at least one of a business process to observe, a workflow to observe, a step of the business process to observe, a flow event to observe, a rule for determining whether a flow event is relevant, a rule for correlating a flow event to a business scenario instance, a process intelligence view for data aggregation, a phase definition, and a milestone definition.

22. The system of claim 17, wherein processing the one or more flow events using the executable description in the data storage system includes correlating the one or more flow events with a business scenario instance.

* * * * *